March 1, 1927.
M. F. CORNEGO
1,619,240
METHOD OF ASSEMBLING PISTON RINGS FOR FINISHING
Filed May 26, 1924    3 Sheets-Sheet 1
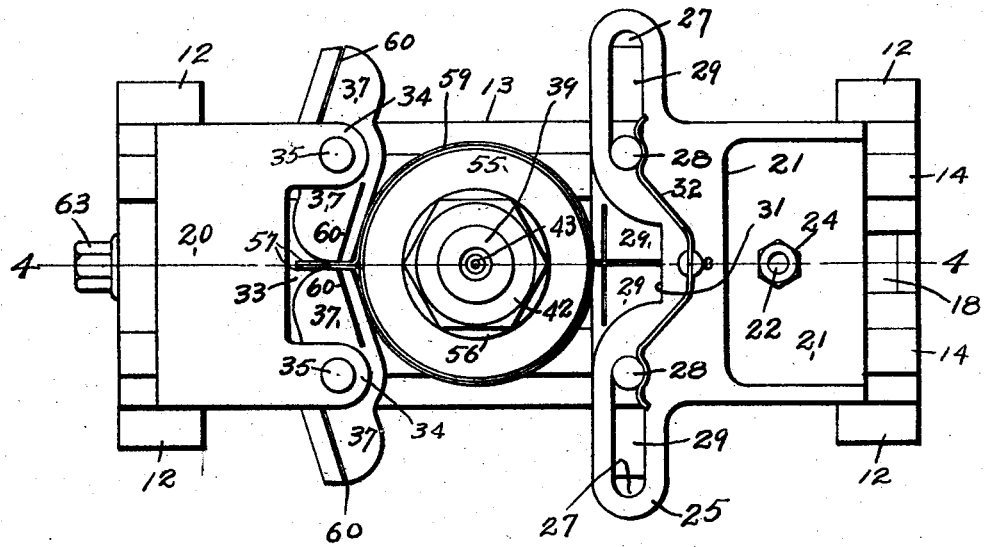
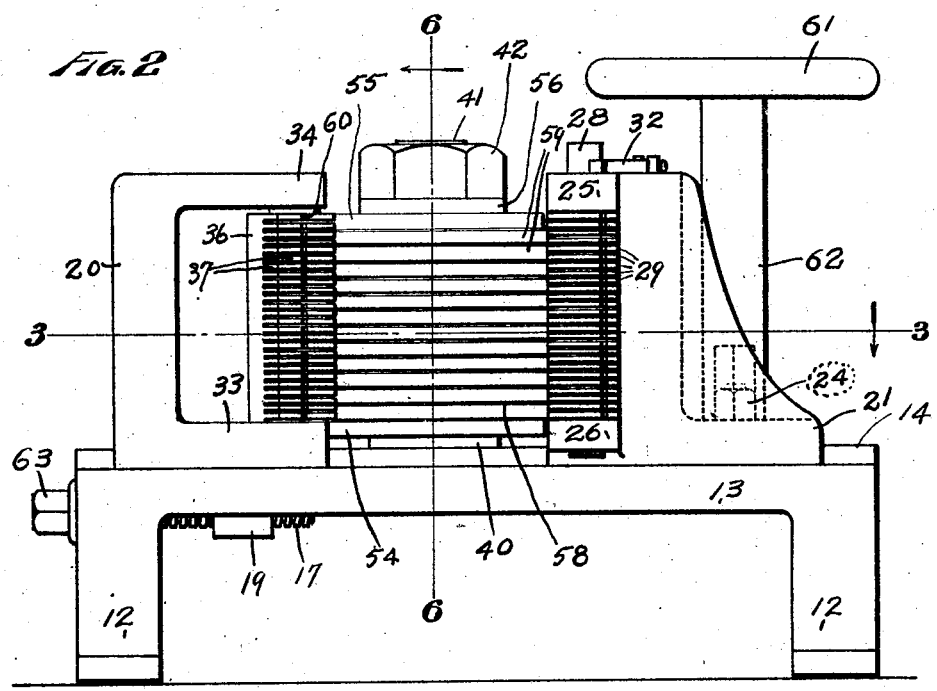
INVENTOR
MANUEL F. CORNEGO
BY Edward E. Lungan
ATTY.

March 1, 1927.   M. F. CORNEGO   1,619,240
METHOD OF ASSEMBLING PISTON RINGS FOR FINISHING
Filed May 26, 1924   3 Sheets-Sheet 2
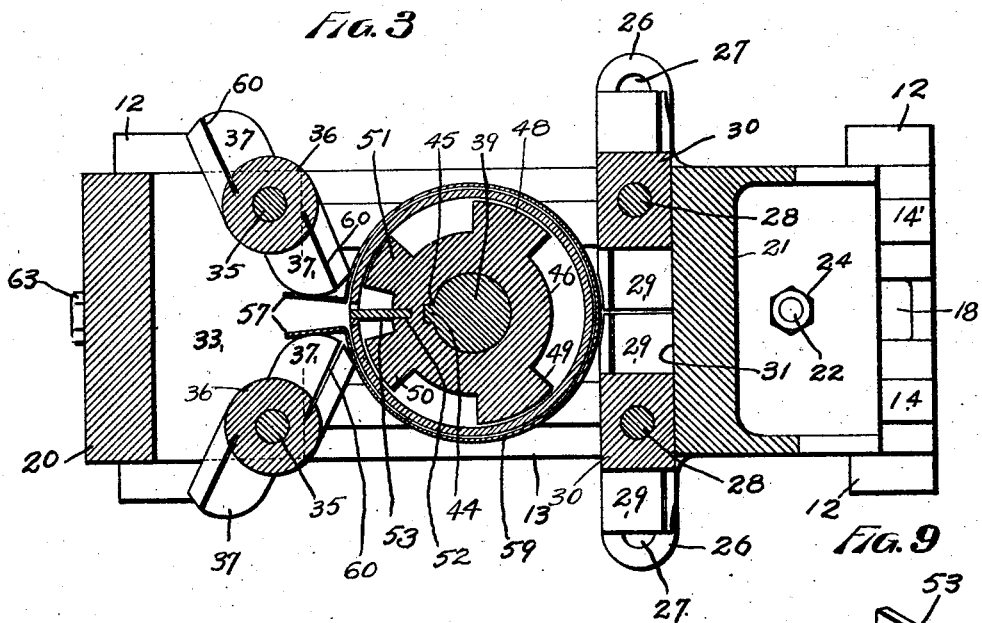
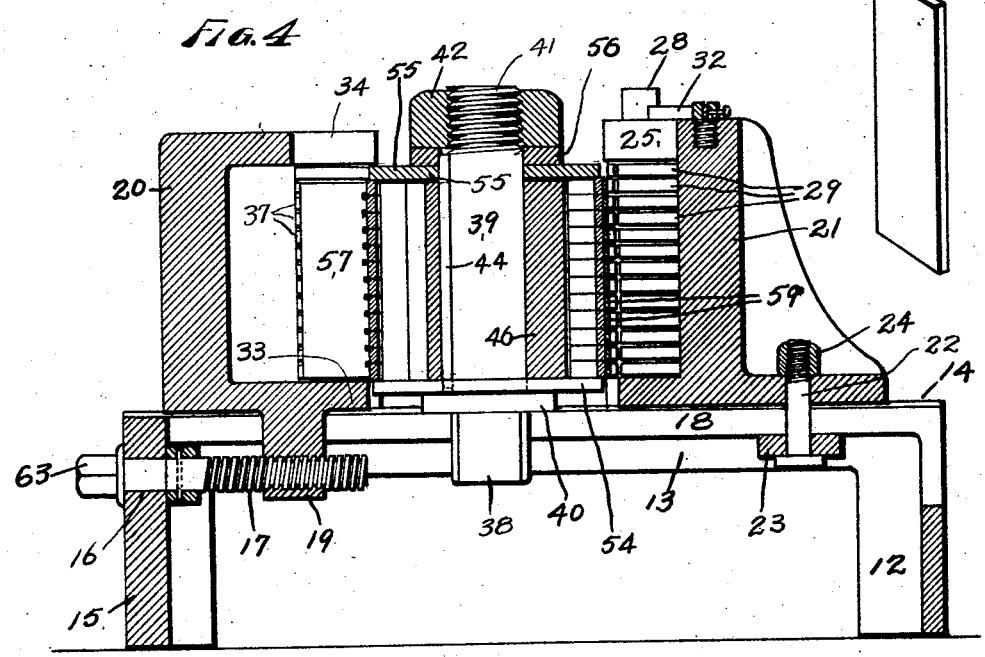
INVENTOR
MANUEL F. CORNEGO
ATTY.

March 1, 1927.
M. F. CORNEGO
METHOD OF ASSEMBLING PISTON RINGS FOR FINISHING
Filed May 26, 1924    3 Sheets-Sheet 3
1,619,240
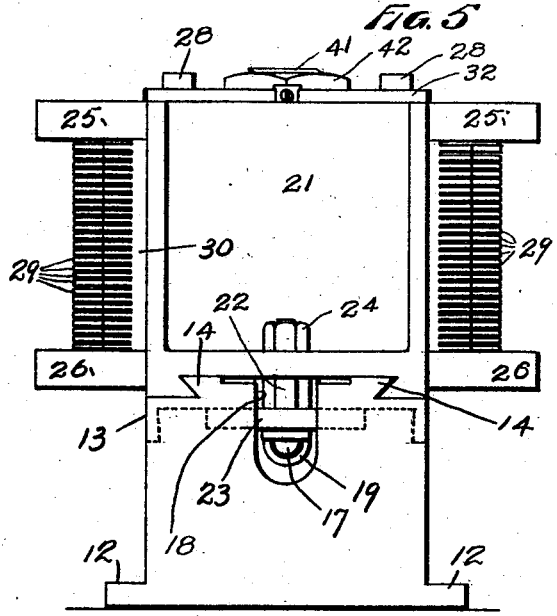
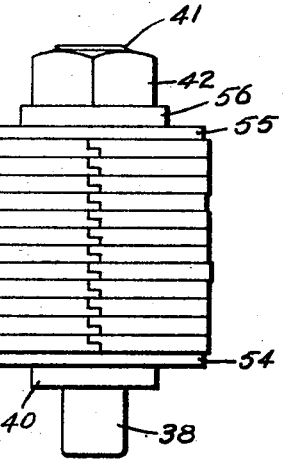
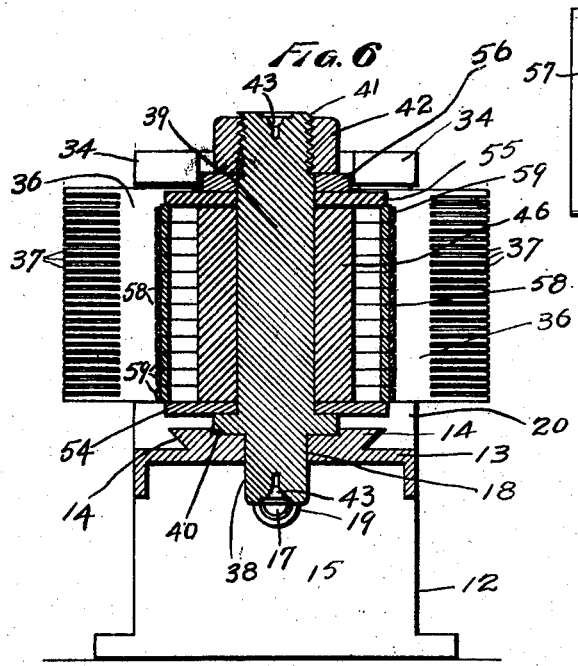
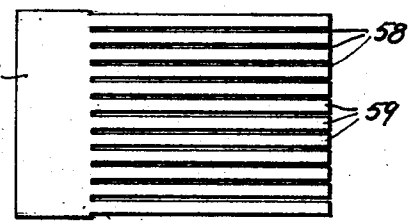
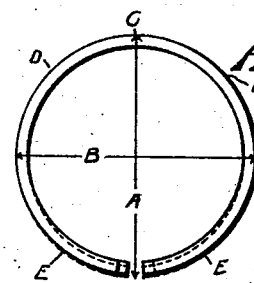
INVENTOR
MANUEL F. CORNEGO
By Edward E. Longan
ATTY.

Patented Mar. 1, 1927.

1,619,240

UNITED STATES PATENT OFFICE.

MANUEL F. CORNEGO, OF ST. LOUIS, MISSOURI.

METHOD OF ASSEMBLING PISTON RINGS FOR FINISHING.

Application filed May 26, 1924. Serial No. 715,874.

My invention relates to improvements in the method of assembling piston rings for finishing and relates primarily to the proper sizing of piston rings regardless of variation in the thickness of the ring so that when the rings are finished, the thickness will be equal all around. In this way a more perfect ring is obtained and one which has an equal amount of resiliency throughout.

A further object is the method of assembling piston rings for finishing by means of which a plurality of superimposed piston rings are tightly contracted around the central core regardless of variation of ring thickness so that when the rings are finally finished, the thickness of every ring in each batch assembled will be the same and absolutely uniform throughout.

A still further object is the method of assembling a plurality of piston rings for finishing in such a manner that the portions subject to collapse are supported on the inside, while the portions which tend to bulge outward are drawn or pressed inward so that when the ring is sprung together completely and secured for finishing the outside, a true circle will be formed and during this assembling any variation in thickness of portions of the rings will appear on the outside so that when the rings are finished they will be of uniform thickness throughout, and consequently the resiliency of each ring will be uniform. In this way I obtain a piston ring which when finished, is of uniform thickness throughout and which has no portions which may be stiffer or weaker in resiliency than other portions of the ring.

In the drawings:

Fig. 1 is a top plan view of my device showing the rings completely contracted and ready to be released from the apparatus and taken to the finishing machine;

Fig. 2 is a side elevation of the same;

Fig. 3 is a horizontal section taken on the line 3—3 of Fig. 2 showing the manner of assembling the rings in the apparatus prior to contracting;

Fig. 4 is a longitudinal vertical section taken on the line 4—4 of Fig. 1;

Fig. 5 is a rear elevation of the apparatus;

Fig. 6 is a vertical cross section taken on the line 6—6 of Fig. 2;

Fig. 7 is an elevation of a plurality of rings as assembled and removed from the machine and illustrating the manner in which unequal thicknesses of rings are taken care of;

Fig. 8 is a side elevation of the cage employed for contracting the rings;

Fig. 9 is a perspective view of the guide made use of for assembling the rings and alining the splits;

Fig. 10 is a top plan view of a piston ring and

Fig. 11 is a side view of the same.

In the construction of my apparatus I employ a base comprising supporting legs 12, these legs support a bed 13. The bed is provided on its upper surface with a dovetailed slide 14. The front legs 12 are joined together by a web 15 which is provided with an opening 16 through which a screw 17 passes. The purpose of this screw will be explained in detail later.

Extending from the rear of the bed is a slot 18, this slot extends forward to the rib or web 15 and is for the purpose of permitting the screw threaded lug 19, carried by the movable jaw 20, to pass therethrough. The movable jaw 20 is provided with a dovetailed slot so that it can be slipped over the dovetailed slide 14. The purpose of using this dovetail is to prevent any tilting of the jaw 20. Adjustably secured on the dovetailed slide 14 is a jaw 21; this jaw is also provided with a dovetail groove for the same purpose as the jaw 20. The jaw 21 carries a bolt 22 which extends through the slot 18 and which carries a bar 23. On the bolt 22 is located a nut 24 by means of which the bar 23 can be tightened against the undersurface of the bed 13 and thus securely hold the jaw 21 in adjusted position. This adjustment is for the purpose of permitting rapid changes for different diameters of piston rings. It also serves the purpose of keeping the work as close to the operator as possible. This would not be the case were the jaw 21 made stationary because as the diameter of the piston rings got smaller, the jaw 20 would necessarily have to be moved closer to the jaw 21 thus taking the work farther away from the operator and making it more awkward to get at.

Formed integral with the jaw 21 are arms 25 and 26, these arms are formed on the forward face of the jaw and project from each side adjacent the top and bottom and are in vertical alinement with each other.

These jaws are provided with slots 27 through which pins 28 project, and carried by these pins are a plurality of spring fingers 29. These fingers, however, are not independent from each other but are formed integral with a central core 30. In this connection it is to be understood that the fingers on one side of the core 30 are all of one width, while those on the opposite side are of one width but different in width from the first mentioned fingers. These widths being preferably slightly less than the width of the rings to be assembled for finishing.

It will be noted from Fig. 3 that when the fingers are in operative position their rear edge abuts or bears against the face 31 of the jaw 21 so that there can be no pivoting of the fingers after they have been placed in operative position.

It will be noted from Figs. 1 and 3 that the ends of the fingers in operative position are in close proximity to each other and in order to prevent their moving apart a spring 32 is mounted on the jaw 21, which spring engages with the pins or studs 28 and holds them against accidental movement.

The jaw 20 is provided with a base 33 and its upper surface with perforated ears 34. These ears are spaced apart and along opposite edges of the jaw and have extending therethrough pins 35. On these pins are pivotally mounted cores 36 which have integrally formed spring fingers 37. These fingers are also of different widths and correspond in this respect to the spring fingers 29. In this connection I desire to state that the pins 35 and 28 may be made removable, if desired, so that the machine can be quickly changed in the event it becomes necessary to change fingers for different piston ring widths.

Extending through the slot 18 is the flattened end 38 of a mandrel 39. The mandrel 39 is also provided with an integral collar 40 adjacent the flattened portion which acts as a support when the mandrel is placed on the bed. The upper end of the mandrel 39 is screw threaded as at 41 so as to receive a nut 42. This mandrel is also centered on both ends as at 43; this is for the purpose of permitting the lathe centers to enter. The flattened portion in addition to preventing the mandrel from turning when in the assembled machine is also used as the end to which the dog can be secured during the finishing operation.

The mandrel 39 is provided with a key 44 which fits in a keyway 45 formed in the spider or core 46. This spider or core has projections 48, 49, 50 and 51, the purpose of these projections will be explained in detail later. Formed in the spider 46 and between the projections 50 and 51 is a keyway 52 in which a guide key 53 is adapted to be seated. The key 53 is for the purpose of properly alining the gaps of the piston rings during the preliminary step of assembling so that all the splits of the rings will be in absolute alinement. If this were not done, the rings could not be assembled properly as will hereinafter be more clearly pointed out.

Loosely mounted on the mandrel and resting on the collar 40 is a plate 54; this plate is circular and its diameter is slightly less than the finished outside of the piston ring. After a plurality of rings have been assembled around the spider, a second plate 55 is placed over the mandrel. This plate is of the same diameter as the plate 54 and both plates are provided with keyways which permits the key 45 to pass therethrough and which prevents any turning of these plates, which turning would destroy the alinement of the gaps in the rings.

Placed on the plate 55 is a collar 56 which is also provided with a keyway. The collar 56 receives the initial pressure from the nut 42 and the purpose of the keyway is to prevent any possible turning of this collar and also to relieve the plate 55 from any turning thrust whatever.

In order to properly contract the bands I make use of a cage which is preferably constructed of sheet steel so as to have a certain amount of flexibility without any appreciable elasticity. This cage is first formed substantially circular and provided with lips 57 which project radially. The portion intermediate these lips is provided with slots 58 so as to form a plurality of individual bands 59; these bands, however, being connected to the lips 57. Each of the bands is of a width slightly less than the width of the rings to be contracted, and a separate cage is employed for each different width of ring. This construction of cage is essential in order that the rings can be assembled as shown in Fig. 7, because were there not a separate band for each individual ring, it would be impossible to take care of the variations of thickness of the rings. But by the employment of my cage any eccentricity of the ring, due to variation in the wall thickness, is readily taken care of by means of the individual bands of the cage and also by the spring fingers, so that after the rings are assembled for finishing the inside surface of the rings will be all equidistant from the center and all inequalities or eccentricity of the rings be present on the outside surface which is to be finished. In this connection it is to be understood of course, that where many such eccentricities exist in an exaggerated degree that ring is discarded. My apparatus and method being intended to take care of the ordinary run of rings with their variations and not of extraordinary conditions.

It will be noted from Figs. 1 and 3 that in addition to the fingers being separated as to their width, an additional cut or slit 60 is made longitudinally in each finger and at a slight distance back from the contacting edge thereof. This provides resiliency for the fingers and is designed to take care of any eccentricity at the point when the fingers exert pressure on the ring. This resiliency, however, is sufficiently stiff to ordinarily exert enough pressure to properly contract the ring, but where eccentricity is present at the point of contact with any one of the fingers, a greater amount of pressure will be exerted thereon. This allows the finger to give so that an equal amount of pressure on all of the rings will result.

In the old method of assembling rings where a solid cylinder which was split in halves and hinged was used it was impossible to properly tighten the rings around the spider because, where varying thicknesses of rings occurred, the thicker rings would be bound tightly against the spider or core on their inner surface, while an adjacent ring having a thin part immediately above or below the thick part of the aforementioned ring would have its outer surface in alinement with the thick part of said ring it would not contact at that point with the spider and consequently in turning up and finishing the outside of the ring the inequalities of the thickness would be followed. This being due to the fact that it was impossible with the solid clamp to draw all of the rings tightly against the center core.

Furthermore by the old assembling method unless the rings were extremely tightly clamped edgewise there would be a possibility of some of the rings which were spaced from the central core, due to the variation in thickness, of being pushed inward thus resulting in an eccentric ring which could not possibly be made to fit the cylinder walls of an engine snugly.

In order to operate my device I make use of a hand-wheel 61 which is provided with an elongated shank 62; this shank is provided with a recess or socket which will readily fit over the nut 24 and also the head 63 of the screw 17. In this way it is not necessary to use a separate wrench to effect the adjustability of the jaw 21, although if desired, a permanently attached hand-wheel can be applied to the screw 17 in place of the head 63 and any kind of wrench used for effecting adjustability of the jaw 21.

My invention is intended primarily for use with individual cast rings, especially such as are commercially known to the trade as a kinked ring. In these rings the diameter A is less than the diameter B, as illustrated in Fig. 10. In other words the portions of the ring adjacent the gap or split are kinked inward. When a split ring is contracted so as to close the gap, the greatest amount of bend or outward movement occurs at the gap and at the point C which is diametrically opposite the gap and at the same time the greatest tendency to move inward is at points located approximately at D and E.

The operation of my device is as follows—

The first step in the operation is to move the jaw 20 toward the front of the bed and place the fingers 37 in the position indicated in Fig. 3. The mandrel 39 has its end 38 inserted in the slot 18 and the plate 54 placed over the mandrel. The proper sized spider is then placed over the mandrel and the key 53 inserted in the keyway 52, after which a plurality of piston rings are slipped over the mandrel, the lower ring coming to rest on the plate 54 and the remainder of the rings superimposed on each other.

As illustrated in Fig. 3 the key 53 extends into the gap of each ring and being vertical will naturally aline all of the gaps in the rings vertically.

The cage is next placed around the rings so that the lips 57 are located between the opposite fingers 37. The adjustable jaw is then moved forward until the fingers 29 contact with the cage and then tightened into position. The screw 17 is then operated by means of the hand-wheel 61, forcing back the jaw 20; this causes the fingers 37 to pivot on the pins 35 and in so doing move toward each other and contract the band. As soon as the band has contracted lightly with the rings, the key or guide 53 is removed and the plate 55 placed in position. After this plate has been placed in position the ring 56 is next placed over the mandrel and the nut 42 then screwed down, preferably by hand, sufficiently far to prevent any lifting of the plate 55. The jaw 20 is then moved toward the jaw 21 and in so doing causes the fingers 37 to exert pressure against the cage, which in turn is imparted to the rings. The fingers 37, however, moving toward each other in a circular movement exert what may be termed a wiping pressure, that is, in addition to exerting a pressure straight back toward the jaw 21 they also exert a pulling action or pressure at right angles thereto. This action draws the individual bands of the cage tightly around the rings. During this operation, it is of course to be understood, that the rear jaw 21 has been immovably secured in place. The tendency of this tightening movement is as follows—The first pressure received by the rings is from the fingers 29, and these fingers, as previously pointed out, resist the tendency of the point C on the rings to spring backward, but have a tendency to force it into the open space between the projections 48 and 49, while these projections simultaneously contacting with the parts or points marked D on the ring will prevent them from moving inward. Similarly the points marked E on the ring contact with the projections 51 of the spider and prevent those points from moving in, while the wiping action of the fingers 37 will have a tendency to force the ring portion adjacent the gap inward. In this manner a complete or substantially true circle is formed when the rings are completely contracted. The fingers 29 prevent the rings from bulging out at the point C, while the wings of the cage, when the rings are contracted completely, abut each other and prevent any bulging of the cage at that point other than that which is caused by inequalities in the thickness of the ring and which is taken care of by the spring fingers. After the rings have been thus contracted, the nut 42 is screwed down tight so that the rings will be firmly clamped against expansion between the plates or disks 54 and 55, after which the jaw 20 is moved forward and the cage removed; the mandrel together with the assembled rings are then removed from the apparatus and is ready for finishing.

It is to be understood however, that previous to being placed in my machine the rings are rough finished inside and also sized as to width, a rough finish being all that is required on the inside of the ring because this part of the ring has no special function to perform, and this rough finish is generally accomplished by grinding although other methods may be used.

Furthermore if found necessary or desirable, the wings of my cage may be reinforced. The construction of the fingers may also be varied without departing from the spirit of my invention. The essential feature being to so contract a split piston ring that its interior surface will follow a true circle and any irregularities of wall thicknesses appear on the outside of the ring prior to finishing so that the same can be equally sized throughout and the finished product result in a ring of equal thickness and resiliency throughout.

Having fully described my invention, what I claim is:—

1. The method of assembling split piston rings for finishing which consists in superimposing a plurality of split rings, applying an inwardly directed pressure adjacent the gap and at a point diametrically opposite the same, applying inwardly directed pressure to the outer circumference of said rings, supporting the inward circumference of said rings at predetermined points against collapse, and lastly subjecting the edges of said rings to a continuous pressure sufficient to hold the same in collapsed position during the finishing operation.

2. The method of assembling split piston rings for finishing which consists in superimposing a plurality of split rings, applying sufficient circumferential pressure to the outside of said rings to close the gaps therein, and simultaneously applying additional inwardly directed pressure to each of said rings individually adjacent each side of the gap and at a point diametrically opposite said gap, supporting said rings at points on their inner surface where collapsing tendency is greatest when the gaps are closed, and lastly exerting pressure on the edges of said rings to hold the same in closed position during the finishing operation.

In testimony whereof, I have signed my name to this specification.

MANUEL F. CORNEGO.